(12) United States Patent
Salmang et al.

(10) Patent No.: US 8,592,017 B2
(45) Date of Patent: Nov. 26, 2013

(54) STRETCH BLOW MOLDED ARTICLES COMPRISING A BLEND OF HDPE/LDPE

(75) Inventors: Rodolfo Salmang, Terneuzen (NL); Peter Schindler, Mannedorf (CH); Marc A. Mangnus, Clinge (NL)

(73) Assignee: Dow Global Technologies LLC, Midland, MI (US)

( * ) Notice: Subject to any disclaimer, the term of this patent is extended or adjusted under 35 U.S.C. 154(b) by 110 days.

(21) Appl. No.: 13/500,042

(22) PCT Filed: Sep. 27, 2010

(86) PCT No.: PCT/US2010/050352
§ 371 (c)(1),
(2), (4) Date: Apr. 3, 2012

(87) PCT Pub. No.: WO2011/043944
PCT Pub. Date: Apr. 14, 2011

(65) Prior Publication Data
US 2012/0193266 A1 Aug. 2, 2012

Related U.S. Application Data

(60) Provisional application No. 61/249,887, filed on Oct. 8, 2009.

(51) Int. Cl.
B29D 22/00 (2006.01)

(52) U.S. Cl.
USPC .................................. 428/35.7; 525/240

(58) Field of Classification Search
USPC ........................................ 428/35.7; 525/240
See application file for complete search history.

(56) References Cited

U.S. PATENT DOCUMENTS

| 3,775,524 | A | 11/1973 | Seefluth |
| 4,145,392 | A | 3/1979 | Valyi |
| 4,668,729 | A | 5/1987 | Kataoka |
| 5,576,083 | A | 11/1996 | Agarwal |
| 2013/0029132 | A1* | 1/2013 | Lv et al. ........................ 428/328 |

FOREIGN PATENT DOCUMENTS

| EP | 870593 B1 | 10/2002 |
| EP | 1449634 A1 | 8/2004 |
| EP | 1679178 A1 | 7/2006 |
| EP | 1265736 B1 | 1/2007 |
| JP | 07-237261 | 9/1995 |
| JP | 09-194543 | 9/1997 |
| WO | 9608356 | 3/1996 |
| WO | 2005074428 A2 | 8/2005 |
| WO | 2005077642 A1 | 8/2005 |
| WO | 2006040627 A2 | 4/2006 |
| WO | 2006040631 A2 | 4/2006 |
| WO | 2007060529 A2 | 5/2007 |

* cited by examiner

Primary Examiner — N. Edwards
(74) Attorney, Agent, or Firm — Whyte Hirschboeck Dudek S.C.

(57) ABSTRACT

Stretch blow molded articles, e.g., thin wall containers, are made from a polymer blend comprising at least 70 percent by weight HDPE and at least 10 percent by weight LDPE based upon the total weight of the polymer blend. The HDPE/LDPE blends used in the practice of this invention provide increased melt strength resulting in a wider processing window.

2 Claims, 3 Drawing Sheets

C1 • HDPE 35060 APV EXTRUDED
C2 × LDPE 150E APV EXTRUDED
C ♦ HDPE 35060+5% LDPE 150E
C ■ HDPE 35060+11% LDPE 150E
C ▲ HDPE 35060+30% LDPE 150E

C1 • HDPE 35060 APV EXTRUDED 190C
2 ■ HDPE 35060+15% LOPE 150E 100C
2 ♦ HDPE 35060+15% LDPE 150E 150C
2 × HDPE 35060+15% LDPE 150E 170C
C2 ▲ HDPE 35060 APV EXTRUDED 150C

STRETCH BLOW MOLDED ARTICLES COMPRISING A BLEND OF HDPE/LDPE

CROSS-REFERENCE TO RELATED APPLICATIONS

This application claims priority to U.S. Patent Application No. 61/249,887 filed on Oct. 8, 2009, the entire content of which is incorporated by reference herein.

FIELD OF THE INVENTION

This invention relates to stretch blow molded articles. In one aspect the invention relates to stretch blow molded thin wall containers while in another aspect, the invention relates to such containers made from a blend of high density polyethylene (HDPE) and low density polyethylene (LDPE).

BACKGROUND OF THE INVENTION

Stretch blow molding (SBM) machinery is designed to rapidly mold packaging and containers for beverages, dairy products, medications and other products from molded preforms and thin sheets. See for example; U.S. Pat. No. 3,775,524; U.S. Pat. No. 4,145,392; U.S. Pat. No. 4,668,729; EP 870,593; EP 1,265,736; EP 1,679,178A; JP 09-194,543; WO 96/08,356A; WO 2005/074,428A; WO 2005/077,642; WO 2006/040,627A; WO 2006/040,631A; and WO 2007/060,529A.

One objective of the SBM process is to obtain the highest possible packaging efficiency ratio, i.e., milliliters of contents per weight of container in grams (ml contents/g container), through optimized wall thickness distribution and container top-load while meeting the processing window requirements at the shortest cycle time. Conventional thermoforming (TF) high impact polystyrene (HIPS) grades demonstrate through experimentation to have sufficient suitability for the compression blow forming (CBF) process. However HIPS has limitations with respect to: environmental stress crack resistance (ESCR), low temperature toughness, and water vapor transmission rate (WVTR). The substitution of HDPE for HIPS can overcome these drawbacks but due to the semi-crystalline structure of HDPE and its limited melt strength, it has a very narrow processing window which makes it an impractical polymer choice for commercial/industrial manufacturing.

BRIEF SUMMARY OF THE INVENTION

In one embodiment the invention is a stretch blow molded article made from a polymer blend comprising at least 70 percent by weight (wt %) HDPE and at least 10 wt % LDPE based upon the total weight of the polymer blend. In one embodiment the invention is a stretch blow molded thin, i.e., 0.4 millimeters (mm) or less, wall container, e.g., bottle, bag, etc., made from a polymer blend comprising at least 70 percent by weight (wt %) HDPE and at least 10 wt % LDPE based upon the total weight of the polymer blend.

The HDPE/LDPE blends used in the practice of this invention provide increased melt strength resulting in a wider processing window. In turn, this allows for the blends to be processed in conventional stretch-blow forming equipment. Furthermore, the melt strength of these polymer blends can be balanced against the friction force of spinning over a wider temperature and strain rate range allowing for controlled thinning during stretching.

DETAILED DESCRIPTION OF THE PREFERRED EMBODIMENT

Definitions

Figure 1:
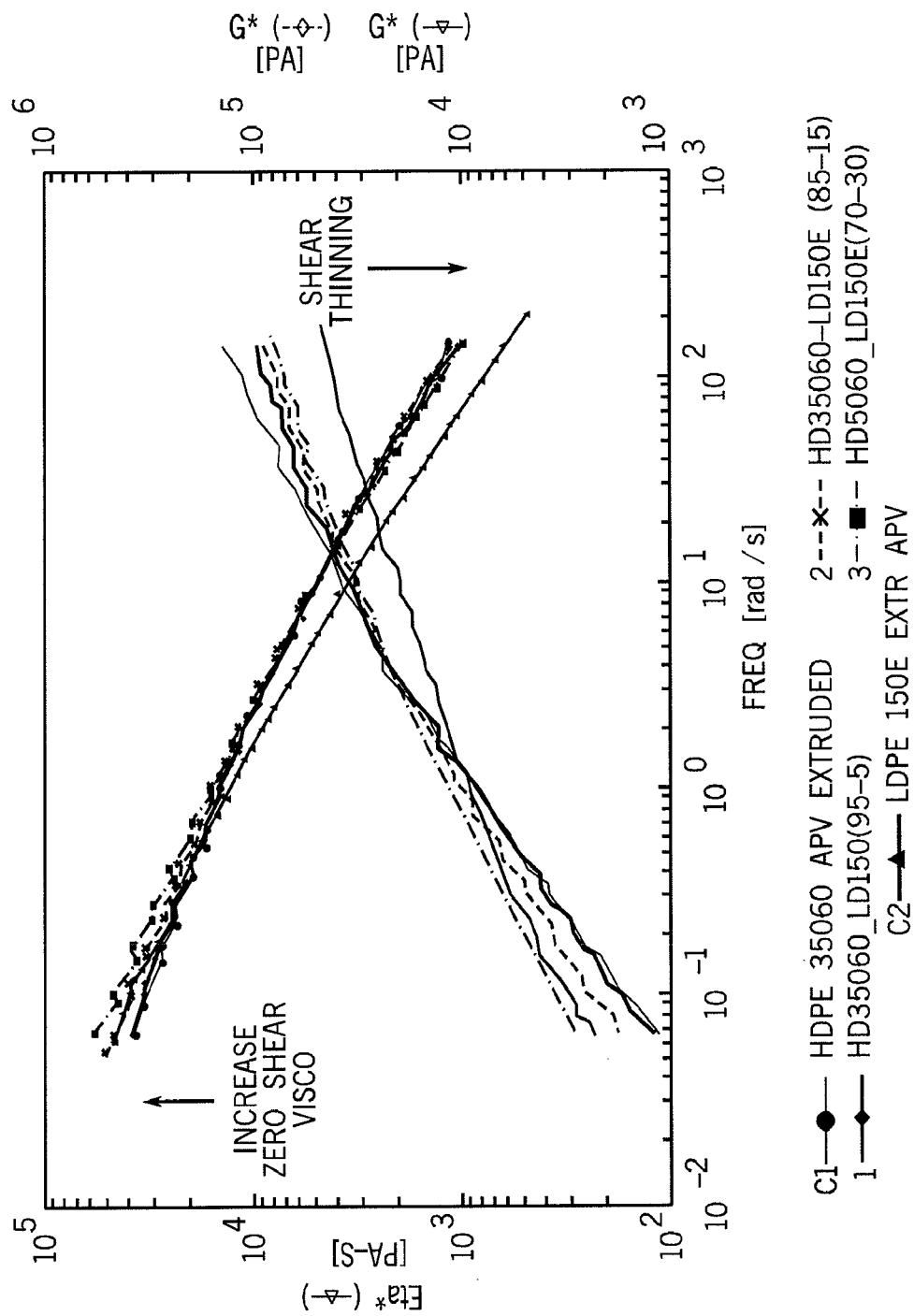
FIG. 1 is a graph reporting melt rheology curves of various HDPE and LDPE blends and resins.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, then the intention is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amount of HDPE and LDPE in the polymer resin blends and the operating parameters of the SBM process.

"Composition", "formulation" and like terms means a mixture or blend of two or more components. In the context of a mix or blend of materials from which a cable sheath or other article of manufacture is fabricated, the composition includes all the components of the mix, e.g., polypropylene, polyethylene co-polymer, metal hydrate and any other additives such as cure catalysts, antioxidants, flame retardants, etc.

"Blend," "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Such blends include both mechanical blends made by admixing two or more of the components together in any mechanical manner, e.g., stirring, tumbling, folding, etc., and in-situ or in-reactor blends made by forming and/or mixing the blend components together during the polymerization process in which the polymer components are made.

Polymer" means a polymeric compound prepared by polymerizing monomers, whether of the same or a different type. The generic term polymer thus embraces the term homopolymer, usually employed to refer to polymers prepared from only one type of monomer, and the term interpolymer as defined below.

"Interpolymer" means a polymer prepared by the polymerization of at least two different types of monomers. This generic term includes copolymers, usually employed to refer to polymers prepared from two different types of monomers, and polymers prepared from more than two different types of monomers, e.g., terpolymers, tetrapolymers, etc.

"Olefin-based polymer" and like terms mean a polymer containing, in polymerized form, a majority weight percent of an olefin, for example ethylene or propylene, based on the total weight of the polymer. Non-limiting examples of olefin-based polymers include ethylene-based polymers and propylene-based polymers.

Melt index ($I_2$, grams per 10 minutes or g/10 min) of the ethylene-based polymers, e.g., HDPE and LDPE, used in the practice of this invention is measured by the procedure of ASTM D-1238 (190° C., 2.16 kilograms or kg).

Density (grams per cubic centimeter or g/cm$^3$) of the ethylene-based polymers, e.g., HDPE and LDPE, used in the practice of this invention is measured by the procedure of ASTM D-792.

Polymer Resins

The HDPE resins that can be used in the practice of this invention are well known, commercially available, and made by any one of a wide variety of processes including, but not limited to, solution, gas or slurry phase; Ziegler-Natta or metallocene catalyzed; etc. These resins have a density of 0.95 to 0.965 g/cm$^3$ and a melt index ($I_2$) of 0.1 to 4.0. Commercially available HDPE resins include but are not limited to DOW High Density Polyethylene resins and CONTINUUM™ and UNIVAL™ high density polyethylene resins, all available from The Dow Chemical Company, BS2581 available from Borealis, Hostalen ACP 5831D available from Lyondell/Basell, HD5502S available from Ineos, B5823 and B5421 available from Sabic, and HDPE 5802 and BM593 available from Total.

The LDPE resins that can be used in the practice of this invention are also well known, commercially available, and made by any one of a wide variety of processes including, but not limited to, solution, gas or slurry phase; Ziegler-Natta or constrained geometry catalyzed; etc. These resins have a density of 0.915 to 0.925 g/cm$^3$, a melt index ($I_2$) of 0.15 to 4.0, and preferably are long chain branched with a broad MWD. Commercially available LDPE resins include but are not limited to DOW Low Density Polyethylene resins available from The Dow Chemical Company and, in general, any fractional MFI resin for use in heavy duty bags or agricultural films such as those available from Borealis, Basel, Sabic and others.

The blends of the present invention may be prepared by any suitable means known in the art such as, for example, dry blending in a pelletized form in desired proportions followed by melt blending in an apparatus such as a screw extruder or a Banbury mixer. Dry blended pellets may be directly melt processed into a final solid state article by, for example, extrusion or injection molding. The blends may also be made by direct polymerization without isolating blend components. Direct polymerization may use, for example, one or more catalysts in a single reactor or two or more reactors in series or parallel and vary at least one of operating conditions, monomer mixtures and catalyst choice. Blending the branched and linear resins at melt temperatures greater than 230° C. may lead to a further increase in melt strength.

The amount of HDPE in the HDPE/LDPE blend is typically at least 70, more typically at least 75 and even more typically at least 80, weight percent (wt %) of the blend with the remainder LDPE. The HDPE component of the blend can comprise two or more grades of HDPE, and the LDPE component of the blend can comprise two or more grades of LDPE. The HDPE/LDPE blend typically has an $I_2$ of 0.1 to 4 g/10 min, more typically 0.15 to 4 g/10 min.

The blends of the present invention may optionally comprise "additional polymers", including one or more other thermoplastic resin, to provide additional improvements in properties including, but not limited to, processability, modulus, compressive strength, hardness, toughness and aesthetics of the final SBM fabricated article. However, any additional polymer adds little, if any, to the melt strength of the HDPE/LDPE blend. Examples of the "additional polymers" include, but are not limited to, linear low density polyethylene (LLDPE), ethylene styrene interpolymers (ESI), polypropylene (PP), polystyrene (PS), ethylene-propylene rubber and styrene-butadiene rubber. If one or more of these additional polymers is present, then it is usually at the expense of the LDPE polymer, i.e., the minimum amount of HDPE in the blend remains at 70 wt %. If an additional polymer is present, typically it is present in an amount of less than 20, more typically less than 15 and even more typically less than 10, wt % based on the total weight of the blend.

Various additives and fillers may be incorporated into the blends of the present invention. These materials include, without limitation, stability control agents, nucleating agents, inorganic fillers, conductive fillers, pigments, colorants, antioxidants, acid scavengers, ultraviolet absorbers or stabilizers, flame retardants, processing aids, extrusion aids, anti-static agents, cling additives (for example, polyisobutylene), and anti-block additives. Certain of these materials, such as inorganic and conductive fillers, may also function as nucleating agents. Examples of antioxidants are hindered phenols (such as, for example, IRGANOX™. 1010) and phosphites (for example, IRGAFOS™. 168) both trademarks of, and commercially available from, Ciba Geigy Corporation.

The additives and fillers are advantageously employed in functionally equivalent amounts known to those skilled in the art. For example, the amount of antioxidant employed is that amount which prevents the polymer blend from undergoing oxidation at the temperatures and environment employed during storage and ultimate use of the polymers. Such amount of antioxidants is usually in the range of from 0.01 to 10, preferably from 0.02 to 5, more preferably from 0.03 to 2, wt % based upon the weight of the polymer blend. Similarly, the amounts of any of the other enumerated additives are the functionally equivalent amounts.

Stretch Blow Molding (SBM) Process

The resin blends of this invention are used in the manufacture of various articles, including but not limited to, containers, packaging, components for consumer electronics and appliances. These resin blends are used in the same manner as known HDPE polymers, for example, extrusion, injection, compression blow forming, compression stretch blow forming, thermoforming, etc. The resin compositions according to the invention are, however, especially suited for stretch blow molding applications. Examples of suitable known stretch blow molding processes (using injection molded preforms) are shown in WO 96/08356A; EP 870,593; JP 07-237,261A; and WO 2005/074428A. The use of compression molded preforms in suitable stretch blow molding processes are shown in WO 2005/077642A; WO 2006/040,631A; and WO 2006/040,627A.

The HDPE/LDPE polymer resin blends of the present invention are used in SBM process in the same manner as known resins except that the processing conditions, e.g., temperature, pressure, etc., are adjusted to accommodate the inventive blend. First a preform is prepared by compression or injection molding, and then it used in either a one or two step stretch blow molding process.

Preferred preform injection molding conditions for use with the resin compositions of the present invention include injection pressures from 1,000 to 28,000 pounds per square inch gauge (psig, or 7 to 193 MegaPascals (MPa); preferably 22,000 psig (152 MPa), and temperatures from 170 to 280° C., preferably 240° C. The use of the relatively high molecular weight resins of the present inventive blends may require adjusted injection molding conditions, such as higher temperatures in hot runner molds and/or re-sized gates.

Preferred preform compression molding conditions for use with the resin compositions of the present invention in a stretch blow molding process are a compression force of from 1,000 to 10,000 Newtons (N) (the equivalent to a range of 1 to 30 MPa for the compression surface area), preferably 5000 N and a temperature from 130 to 190° C.; preferably 170° C.

The SBM process is performed using known SBM equipment and, generally, according to the known process conditions, adjusted as necessary, for the HDPE/LDPE polymer resin blends according to the present invention.

In a two-step or reheat stretch blow molding process, the preforms are produced in a discrete and separate first step, removed from the molding process, then cooled, optionally stored and delivered to the subsequent stretch blow molding process. Then, for the stretch blow molding, the preform is reheated, stretched and blow molded in a separate stretch blow molding machine. Various heating methods can be used in the preform (re)heating section, including infrared, convection, and/or microwave heating.

The preform (either injection or compression molded) and SBM steps can take place in different locations with a two-step process and frequently the preform molder sells or delivers the preforms to a location where the container contents (such as dairy products) are produced, where the preforms are blow molded into bottles or containers and filled.

Alternatively, to make these processes more energy efficient, the stretch blow molding step on preforms can be done immediately or shortly after the preform molding step, maintaining the preform at the elevated temperature from the preform molding process, thus saving at least some of the heating that would otherwise be required. In such a single station stretch blow molding process, the molding of the preforms and the stretch and blow molding steps are both done on one machine unit, typically of a carousel type. The preforms are molded at one point by either injection or compression molding and then (while still retaining the heat from the molding process) stretched and blow molded in the container mold.

For either compression or injection molded types of preforms and with either a one- or two-stage process, the stretch blow molding process is similar and involves the same common series of steps.

The first step is the heating of the preform. The body of the preforms are heated (optionally kept hot as possible from the molding step) to an appropriate heat-softened temperature that will yield sufficiently in the stretching and molding steps while the neck (or mouth or rim) is below that temperature to provide support to the preform during the stretching and blowing steps. The heating can be done by any known heating technique such as infrared, convection and/or microwave heating. The heating may have been done partially or completely in the preform molding process for a one-stage process. Alternatively, for a two-stage process, the heating is done by conveying the preform through heaters of conventional type(s).

The second step is the stretching the body of the preform. The heat softened preform is physically stretched in a stretch blow molding apparatus with a stretching means such as a plunger or plug, to approximate the length dimension of the final container. The stretching is typically done at a strain rate of from 10 to 450 millimeters per second (mm/s); preferably at 200 mm/s and at temperatures from 130 to 190° C.; preferably at 160° C. In the stretching step the HDPE/LDPE resin blend is subjected to axial elongational strain which contributes to the mechanical properties of the SBM products.

The third step is the stretch blow molding of the preform to the article shape. Fluid pressure, such as gas pressure, including air pressure, from inside the container and optionally vacuum from outside the container, shapes the preform to conform to the mold shape. The blowing step typically uses an internal pressure, such as air pressure, from 3 to 20 bar (0.3 to 2 MPa); preferably 8 to 12 bar (0.8 to 1.2 MPa). During the blowing step the HDPE/LDPE polymer resin blend is subjected to strains in the hoop direction or perpendicular to the axial strain which also contributes to the mechanical properties of the SBM products. The mold temperature is from 15 to 45° C., preferably 30° C., during the blowing pressure and holding stages for cooling times that are typically from 1.5 to 14 seconds, preferably less than 5 seconds and more preferably 2 seconds.

The last step is the cooling and ejection of the stretch blow molded article from the stretch blow molding apparatus. The shaped container cools, solidifies sufficiently for physical contact and handling, the movement of the polymer chains is frozen, and the molded container is removed from the SBM apparatus.

The resin compositions according to the invention are also suited for use in extruded sheet thermoforming processes which can also be viewed as a type of stretch blow molding process where the extruded sheet is the preform. Thermoforming processes are known in the art and can be done in several ways, as taught for example in "*Technology of Thermoforming*"; Throne, James; Hanser Publishers; 1996; pp. 16-29. In a "positive" thermoforming process a gas or air pressure is applied to the softened sheet, the sheet is then stretched like a bubble and a male mold is brought into the "bubble". Then vacuum is applied to conform the part to the male mold surface. In this thermoforming process the required biaxial stretching/orientation is done primarily in one step in which a gas or air pressure is applied to the softened sheet. The sheet is thus biaxially oriented when it is stretched like a bubble to nearly the final part size. The molding step is then completed with the vacuum and male mold to freeze the orientation into the sheet for a good balance of physical and appearance properties.

In a "negative" thermoforming process a vacuum or a physical plug is applied to the heat softened sheet and brings the sheet to nearly the final part size. Then, with positive air pressure or further external vacuum forming the sheet against an outer, female mold, the orientation is frozen into the polymer and the sheet is formed into the article. This negative thermoforming provides somewhat more axial orientation with somewhat less orientation in the hoop direction.

As discussed above, retention of sufficient by biaxial orientation is important in maintaining the wall strengths in stretch blow molded containers.

The following experiments are provided to illustrate various embodiments of the invention. They are not intended to limit the invention as otherwise described and claimed. All numerical values are approximate, and all parts and percentage are by weight unless otherwise indicated.

Specific Embodiments

Materials and Blends

HDPE/LDPE blends are prepared from DOW™ HDPE 35060E (density of 0.960 g/cm$^3$ by ISO 1183/D (Annealed); MFR of 0.29 g/10 min by ISO 1133 (190° C./2.16 kg)) and DOW™ LDPE 150E (density of 0.921 g/cm$^3$ by ASTM D792; MFR of 0.25 g/10 min by ISO 1133 (190° C./2.16 kg)). The inventive blends and comparative resins are reported in Table 1.

TABLE 1

HDPE/LDPE Blend Compositions

| Resin | Sample No. | | | | |
|---|---|---|---|---|---|
| | C1 | 1 | 2 | 3 | C2 |
| HDPE (wt %) | 100 | 95 | 85 | 70 | 0 |
| LDPE (wt %) | 0 | 5 | 15 | 30 | 100 |

Three inventive blends (Samples 1-3) and two comparative resins (Samples C1 and C2) are prepared using a seven-zone APV extruder. The temperature (° C.) of the first through seventh zones is, respectively, 170, 180, 190, 200, 210, 220 and 225. The die temperature is the same temperature as the seventh zone, i.e., 225° C. The melt temperature of each resin or resin blend is about 231° C. The extruder screw is rotated at 200 revolutions per minute (rpm). Specific conditions to each sample are reported in Table 2.

TABLE 2

APV Extruder Operating Conditions

| Condition | Sample No. | | | | |
|---|---|---|---|---|---|
| | C1 | 1 | 2 | 3 | C2 |
| Pressure (Bar) | 16 | 18 | 20 | 22 | 14 |
| Torque (%) | 68-72 | 67-70 | 63-67 | 60-65 | 63-67 |
| Output (kg/hr) | 3 | 3 | 2.9 | 3.1 | 3.1 |
| Feeder Set | 0.9 | 1 | 1.3 | 1.5 | 2.1 |

Dynamic or Small Amplitude Oscillatory Shear

Small amplitude oscillatory shear is performed on disks stamped from a compression molded plaque. Compression molding is done according to ASTM D1928 at 190° C. The tests are done with an ARES system of TA Instruments at temperatures of 170-190 and 210° C. in the frequency domain of 0.1 to 100 rad/sec with a strain of 10% and parallel plate setup 25 mm diameter. All tests are preformed under a nitrogen atmosphere. Mastercurves are generated using Orchestrator software of TA Instruments.

Thermoforming tests are performed with a RDA II of TA Instruments. Parallel plates (25 mm) are used. Small disks from compression molded plaques are used. The temperature ramp is from 200 to 100° C. with a maximum strain of 1%. The cooling rate is 2° C. per minute.

Melt Strength

Melt strength is determined with a Rheotens and extruder as melt feeder of Goettfert, the ARL 72. The spin line length is 100 mm, temperature 190° C., and acceleration of 24 mm/sec$^2$. The output is 600 g/hr, and the die is 30/2.5 with an entrance angle of 30°. Data is processed with a Rheotens module of Rheodata. Melt strength is also measured at 150° C. and 170° C. for Sample 2 and 150° C. for Sample C1.

Dynamic Melt Rheology Results

The effect of blending LDPE on the melt rheology of compression molded plaques of each of the samples is measured and reported in FIG. 1. The effect of the LDPE on the energy of activation (Eact) in Sample 3 is lower than expected. Clearly observed is the increase of viscosity at the small angular frequency. This improves the sagging effect. At high angular frequency more shear thinning is observed as more LDPE is present in the samples, and this improves the extrusion process.

Figure 2:
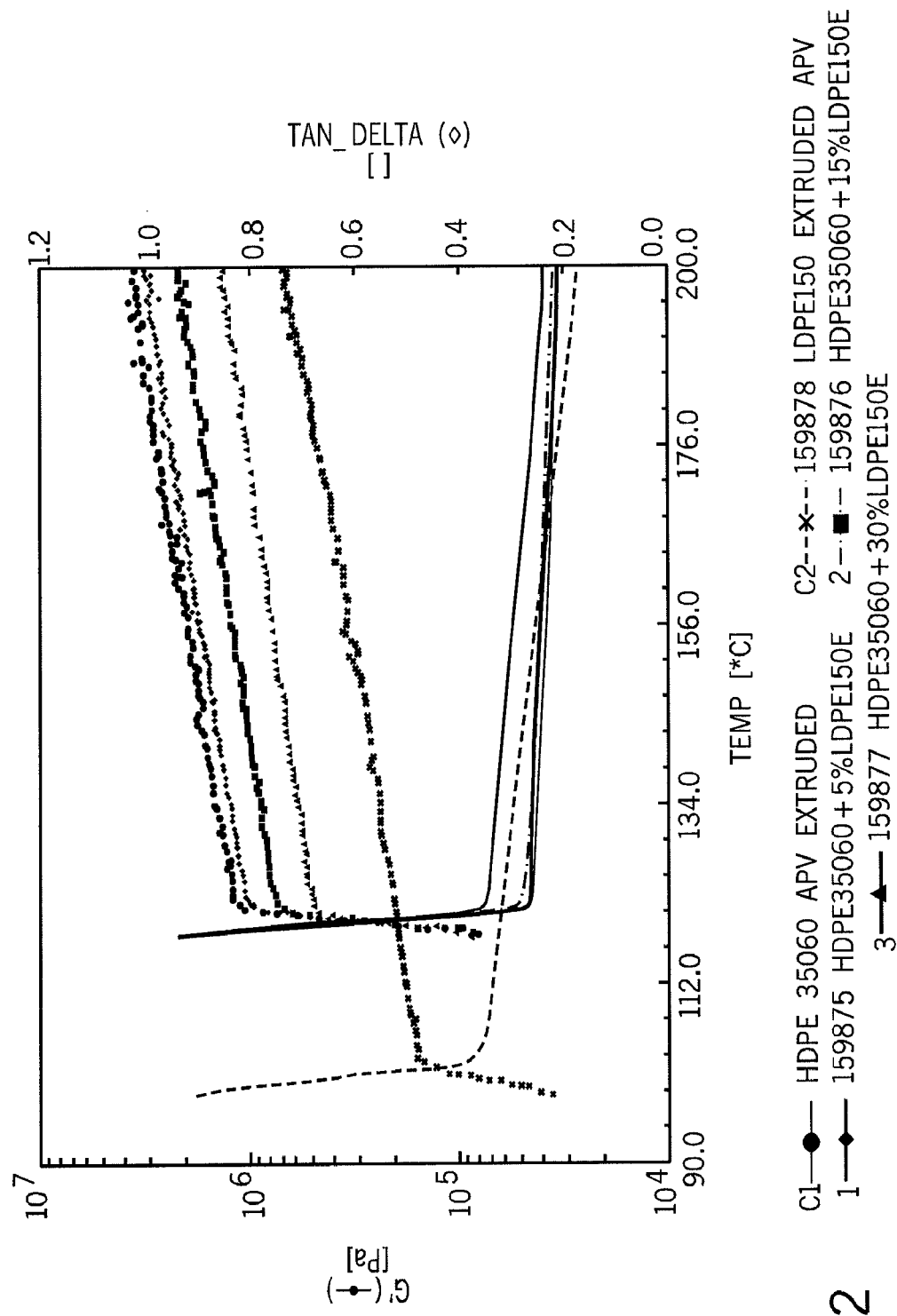
FIG. 2 is a graph reporting the G' and tan delta versus temperature of various HDPE and LDPE blends and resins.

FIG. 2 is a plot reporting the G' and tan delta versus temperature of each sample. Blending of the LDPE into the HDPE does not have any significant effect on the onset of crystallization of the HDPE which is observed as the steep onset of G' at 122° C. Even with the addition of 30 wt % LDPE no significant difference in the crystallization of HDPE is observed. HDPE is the matrix or continuous phase in the blend with LDPE.

The effect of the LDPE is shown in the decrease of the tan delta with increasing amounts of LDPE. The addition of the LDPE increases the elasticity of the HDPE and resulting blend. At the level of 15 to 30 wt % LDPE, the G' increases significantly and is even higher as compared to C1 and C2 which are the individual components. This can mean that the blend is not homogeneous but that the LDPE is more of a dispersed phase within the continuous phase. In the melt state, the blends have a higher elasticity which may allow thermoforming at higher temperatures (note that the tan delta is less than 1 for Sample 1 at 200° C. but for Samples 2 and 3 the temperature shifts to greater than 200° C.).

Figure 3:
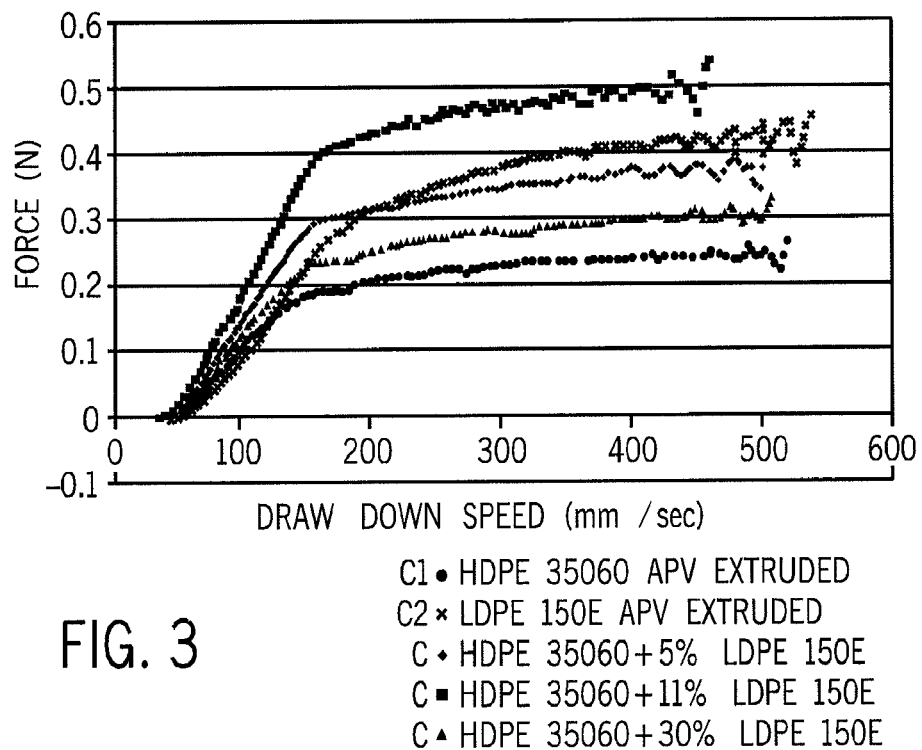
FIG. 3 is a graph of the melt strength at 190° C. of various HDPE and LDPE blends and resins.

FIG. 3 is a graph of the melt strength of all of the samples at 190° C. Surprisingly, the melt strength of Sample 3 is higher than that of C2 (100% LDPE). This is consistent with the G' of the thermoforming results. The addition of LDPE to HDPE does not result in a broader temperature window between G' at 2E4 and 2E5 Pa as compared to HDPE (or a less steep increase in G'). The benefit is found, however, in the higher melt strength of the blends as compared to 100% HDPE (Sample C1) which makes it possible to thermoform at higher temperatures.

Figure 4:
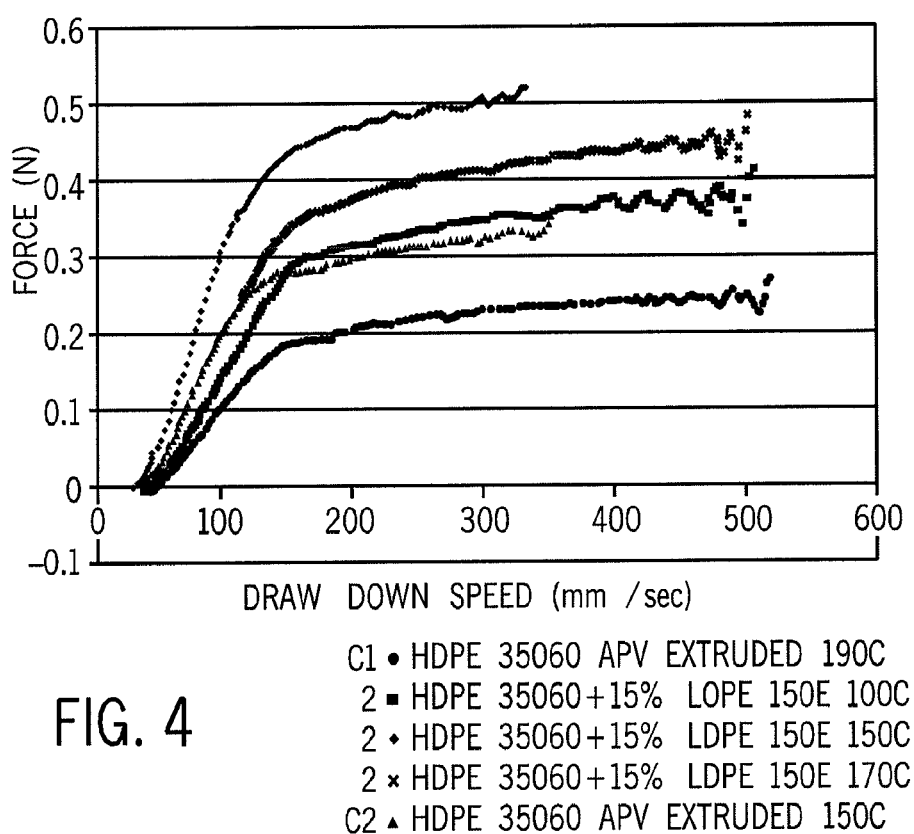
FIG. 4 is a graph of the melt strength at 150-170 and 190° C. of various HDPE and LDPE blends and resins

FIG. 4 is a graph of the melt strength of Sample 2 at 150-170 and 190° C. and Sample C1 at 150 and 170° C. The graph shows that at 190° C., Sample 2 has the same melt strength as the HDPE at 150° C., a 40° C. difference.

Table 3 reports the stress and strain at break of the samples at different temperatures, and clearly the addition of LDPE results in a strain at break much higher than that of 100 wt % HDPE (Sample C1).

TABLE 3

Stress and Strain at Break of the Samples at Various Temperatures

| Sample No. | Temperature (° C.) | Velocity at Break (mm/sec) | Force at Break (N) |
|---|---|---|---|
| 2 | 150 | 317.6 | 0.4933 |
| 2 | 170 | 485.4 | 0.4285 |
| 2 | 190 | 488.2 | 0.3597 |
| C1* | 150 | 341.8 | 0.3132 |
| C1* | 190 | 514.2 | 0.2393 |

C1* is DOW$^{tm}$ HDPE 35057 with a density of 0.958 g/cm$^3$ by ASTM D792 and MFR of 0.29 g/10 min by ASTM D1238 (190° C./2.16 kg). Melt strength is measured as described above. The Rheotens test is performed at increasing velocity till the strand breaks. Force at break is considered melt strength and both force at break and velocity at break are reported in Table 3.

Although the invention has been described in considerable detail, this detail is for the purpose of illustration and is not to be construed as a limitation on the scope of the invention as described in the pending claims. For purposes of U.S. patent practice, the contents of any referenced patent, patent application or publication are incorporated by reference in their entirety (or its equivalent US version is so incorporated by reference) especially with respect to the disclosure of synthetic techniques, definitions (to the extent not inconsistent with any definitions specifically provided in this disclosure), and general knowledge in the art.

What is claimed is:

1. A stretch blow molded thin-wall container having a wall thickness of 0.4 mm or less and made from a polymer blend having a melt index of 0.10 to 4 g/10 min, and comprising (a) at least 70 percent by weight (wt %) HDPE having (i) a density of 0.95 to 0.965 g/cm$^3$, and (ii) a melt index of 0.10 to 4 g/10 min, and (b) at least 10 wt % LDPE (i) having a density of 0.915 to 0.925 g/cm$^3$, and (ii) a melt index of 0.15 to 4 g/10 min based upon the total weight of the polymer blend.

2. A compression blow formed thin-wall container having a wall thickness of 0.4 mm or less, and made from a polymer blend having a melt index of 0.10 to 4 g/10 min, and comprising (a) at least 70 percent by weight (wt %) HDPE having (i) a density of 0.95 to 0.965 g/cm$^3$, and (ii) a melt index of 0.10 to 4 g/10 min, and (b) at least 10 wt % LDPE (i) having a density of 0.915 to 0.925 g/cm$^3$, and (ii) a melt index of 0.15 to 4 g/10 min based upon the total weight of the polymer blend.

* * * * *